(12) United States Patent
Ward et al.

(10) Patent No.: US 8,605,402 B2
(45) Date of Patent: Dec. 10, 2013

(54) HEAT SENSOR RESPONSIVE TO ELECTRICAL OVERLOADS

(76) Inventors: Michael J. Ward, Maryville, TN (US); Aleph Ruiz Contreras, Oak Ridge, TN (US)

( * ) Notice: Subject to any disclaimer, the term of this patent is extended or adjusted under 35 U.S.C. 154(b) by 387 days.

(21) Appl. No.: 12/981,850

(22) Filed: Dec. 30, 2010

(65) Prior Publication Data

US 2011/0134575 A1    Jun. 9, 2011

Related U.S. Application Data (63) Continuation-in-part of application No. 12/632,095, filed on Dec. 7, 2009, now Pat. No. 8,159,803.

(51) Int. Cl.
*H02H 5/04* (2006.01)

(52) U.S. Cl.
USPC .......................................... 361/103; 361/106

(58) Field of Classification Search
USPC ........................................................ 361/103
See application file for complete search history.

(56) References Cited

U.S. PATENT DOCUMENTS

| | | | |
|---|---|---|---|
| 4,763,365 A | 8/1988 | Gerondale et al. | |
| 5,590,010 A | 12/1996 | Ceola et al. | |
| 5,742,464 A | 4/1998 | Ceola et al. | |
| 6,166,618 A | 12/2000 | Robertson et al. | |
| 6,525,914 B1 | 2/2003 | Legatti | |
| 6,552,888 B2 | 4/2003 | Weinberger | |
| 6,603,385 B2 | 8/2003 | Kitchens | |
| 6,707,652 B2 | 3/2004 | Engel | |
| 7,385,473 B2 | 6/2008 | Fabian et al. | |
| 7,400,225 B2 | 7/2008 | Shea | |
| 7,446,643 B2 | 11/2008 | Lee et al. | |
| 2002/0180451 A1 | 12/2002 | Leopold et al. | |
| 2009/0251832 A1* | 10/2009 | Brugner et al. | 361/42 |
| 2010/0046126 A1* | 2/2010 | Elms | 361/42 |

* cited by examiner

*Primary Examiner* — Dharti Patel
(74) *Attorney, Agent, or Firm* — Knox Patents; Thomas A. Kulaga (57) ABSTRACT

Apparatus for detecting an overheating condition at an electrical power device and automatically breaking the circuit when the temperature exceeds a setpoint value. In various configurations the device is a receptacle adapted to be used in a wall mounted box or a receptacle unit that is plugged into an existing receptacle. A temperature sensor is wired parallel to a normally open test switch on a ground fault circuit interrupter or other circuit interrupting device. The temperature switch is responsive to the temperature local to the receptacle, such as is caused by poor connections to or in the receptacle or a near-overload condition. The temperature setpoint is less than the melting temperature of the insulation of the electrical wiring. The temperature sensor is a thermistor with a negative temperature coefficient that allows current to flow thereby latching the interrupting device in a tripped position until the device is reset for reuse.

20 Claims, 5 Drawing Sheets

HEAT SENSOR RESPONSIVE TO ELECTRICAL OVERLOADS

CROSS-REFERENCE TO RELATED APPLICATIONS

This application is a continuation-in-part of prior application Ser. No. 12/632,095, filed Dec. 7, 2009.

STATEMENT REGARDING FEDERALLY SPONSORED RESEARCH OR DEVELOPMENT

Not Applicable

BACKGROUND OF THE INVENTION

1. Field of Invention

This invention pertains to a temperature sensor that detects high temperature conditions caused by electrical overloads. More particularly, this invention pertains to a temperature sensor that cooperates with a circuit that interrupts the power circuit to the electrical appliance based on the temperature proximate the temperature sensor.

2. Description of the Related Art

Every year there are thousands of electrical fires in homes. Hundreds die every year in these fires, with many more injured. Some of these fires are caused by electrical system failures and defective appliances. But, many more of these fires are caused by the misuse and poor maintenance of electrical appliances, incorrectly installed wiring, and overloaded circuits and extension cords.

Electrical circuits are protected from overcurrent conditions by circuit breakers. These circuit breakers are centrally located. Fixed wiring runs from the circuit breakers to power receptacles located throughout the home. The typical receptacle is configured to receive two plugs from electrical devices. It is not uncommon for people to use adapters in order to plug more than two electrical devices into such a receptacle. Such misuse, although not commonly resulting in an overcurrent condition that will trip a circuit breaker, often exceeds the capabilities of the adapter, which may result in overheating of the adapter and/or the receptacle. Also, the adapter or one of the multitude of electrical plugs may have a high resistance connection, which results in resistance heating of the connection. Another type of misuse is the continued use of frayed or damage electrical cords. Without the protection of the circuit breaker tripping the circuit, such misuse can result in an electrical fire.

Ground fault circuit interrupters (GFCIs) are becoming more common. Ground fault circuit interrupters monitor the circuit for ground faults, and trip the circuit when one is detected. A ground fault is a condition where the current flowing through the hot lead to the device is not equal to the current flowing through the neutral lead to the device. When the two current values are not equal, then some amount of current must be flowing through a ground connection, which indicates a potential electrical safety hazard. Although GFCIs provide electrical safety to people, GFCIs do not protect against hazards that typically result in electrical fires.

Arc fault circuit interrupters (AFCIs) are also becoming common. Arc fault circuit interrupters monitor the circuit for electrical arcs, such as caused by loose connections or frayed wiring that causes a short circuit. The AFCI typically reacts to an arcing condition before a traditional circuit breaker, which operates based on current flow or thermal heating of a trip element. Arc fault circuit interrupters are an important line of defense against electrical fires, but AFCIs do not detect all conditions that result in electrical fires.

Attempts have been made to provide a device useful for reducing the number of electrical fires. For example, U.S. Pat. No. 7,400,225 discloses a receptacle that includes a fusible link that interrupts the circuit upon detecting an overheating condition, such as a glowing contact or series arcing. The fusible link opens the circuit permanently, thereby requiring replacement of the receptacle in order to return the connected devices back to service.

BRIEF SUMMARY OF THE INVENTION

A temperature sensor is incorporated in an electrical device, such as a power cable or a power receptacle, and cooperates with a power circuit interrupting device, such as a ground fault interrupter (GFI or GFCI) or an arc fault interrupter (AFI). In one embodiment, the temperature sensor is incorporated in a ground fault interrupter (GFI) or other circuit interrupter in such a way that the test feature of the interrupter is actuated upon detection of an elevated ambient temperature or the circuit interrupter is otherwise actuated, thereby causing the interrupter to break the circuit for the load. The broken circuit is latched until a reset switch is actuated. In one embodiment, the temperature sensor is a thermistor that has a resistance value at a temperature between the maximum operating rating of the cable and/or wiring and the insulation melting point that is sufficient to trip the interrupter. In this way, potentially hazardous conditions that do not involve current flow sufficient to trip upstream circuit breakers are prevented from developing into a hazardous condition. The temperature sensor is responsive to the ambient temperature proximate the sensor.

In another embodiment, the temperature sensor is a temperature switch with normally open switch with the switch contacts in parallel with the normally open contacts of the test switch of the interrupter. The temperature switch is positioned proximate the receptacle housing in such a manner that the temperature switch is responsive to heat generated from the various electrical connections within and/or plugged into the receptacle housing. In various embodiments the receptacle is configured for permanent mounting with connections to the service wiring or as a portable unit that plugs into another receptacle.

In various embodiments, the temperature switch or sensor is incorporated in a wall mounted receptacle, a wall mounted circuit interrupter, and a device that plugs into a wall receptacle, such as a plug-in receptacle or a power strip.

In one embodiment, the temperature sensor is mounted in an assembly. The temperature sensor assembly has a temperature sensor with a ground lug electrically connected to the temperature sensor and a neutral lug connected to the sensor. Between the two lugs is an insulator that mechanically supports the lugs in position and also supports the temperature sensor. The lugs have a configuration adapted to mate the ground lug to a ground terminal on a receptacle and to mate the neutral lug to a neutral terminal on the receptacle. For the embodiment in which the receptacle includes a circuit interrupter, the neutral lug connects to a load side neutral terminal.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Apparatus for interrupting an electrical circuit upon detecting a high temperature is disclosed. The high temperature is greater than the wire/cable temperature rating and less than the melting temperature of the insulation. The high temperature is often caused by misuse of the receptacle 102, such as by using an adapter to plug multiple devices into the receptacle 102 and/or using frayed or damaged cords. As used herein, the suffixes, for example, -A and -B, appended to a reference number indicate an embodiment of a component. When the reference number is used without the suffix, the generic component is being referenced.

Figure 1:
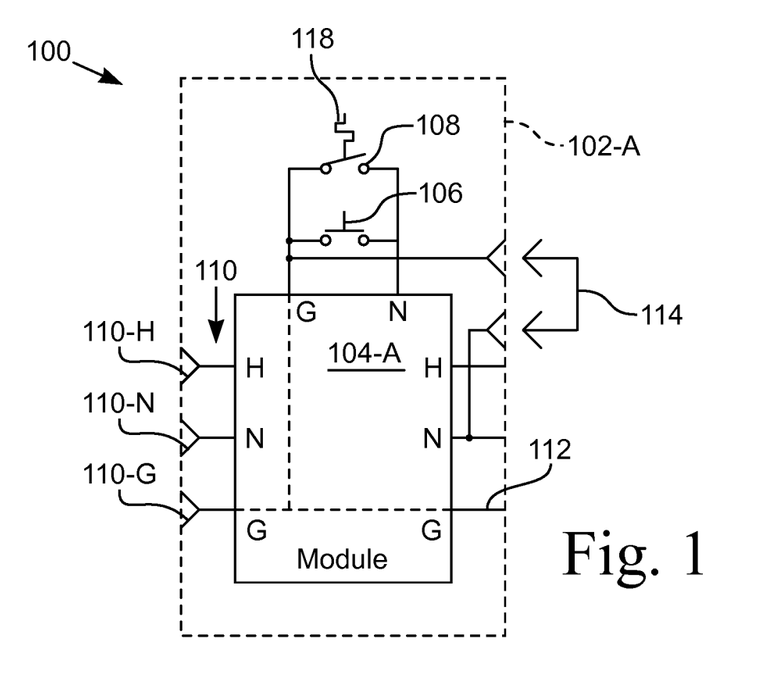
FIG. 1 is a schematic diagram of one embodiment of a heat actuated interrupter receptacle.

FIG. 1 illustrates a schematic diagram of one embodiment of a heat actuated interrupter receptacle device 100. A receptacle 102-A houses an interrupting module 104-A that includes a set of input, or line, connections 112, such as those that connect to a power source, and a set of output, or load, connections 110, such as those of a receptacle socket. The receptacle 102-A also includes a test switch 106 that is connected to the module 104-A. Connected in parallel with the test switch 106 is a temperature switch 108.

The module 104-A, in one embodiment, is a ground fault interrupting (GFI) module that breaks, or interrupts the circuit between the input connections 112 and the output connections 110. Corresponding ones of the input connections 112 are connected to the output connections 110 to form a circuit between the input 112 and the output 110 during normal, or non-tripped, operation. The module 104-A interrupts the circuit upon detection of a ground fault condition. A ground fault condition is a current imbalance between the hot H and neutral N connections of the input connections 112, such as when the current flow through the hot H connection 110-H is greater than the current flow through the neutral N connection 110-N. In a three-conductor system, such a condition can occur when a portion of the current flowing through the hot H lead 110-H also flows through the ground G lead 110-G or through another ground connection, such as an electrical earth. The test switch 106 in such an embodiment simulates an imbalance, or a ground fault, and causes the GFI module 104-A to trip, thereby interrupting the circuit connected to the output connections 110.

The module 104-A, in another embodiment, is a circuit interrupting module that breaks, or interrupts the circuit between the input connections 112 and the output connections 110. The circuit interrupting module 104-A includes a relay or circuit breaker that breaks the circuit between the input connections 112 and the output connections 110. In such an embodiment, the test switch 106 actuates the relay or circuit breaker and causes the circuit interrupting module 104-A to trip, thereby interrupting the circuit connected to the output connections 110.

A temperature switch 108 is connected in parallel with the test switch 106. In the illustrated embodiment, the test switch 106 is a normally open switch and the temperature switch 108 is also a normally open switch before it is actuated by a sensed high temperature. In this way, either the temperature switch 108 or the test switch 106 will actuate the module 104-A and interrupt the circuit between the input connections 112 and the output connections 110. In another embodiment, the test switch 106 is a normally closed switch that opens to test. In such an embodiment, the temperature switch 108 is a normally closed switch in series with the test switch 106.

The temperature switch 108 includes a temperature sensor 118 that is responsive to the ambient temperature around the receptacle 102. In one embodiment, the temperature switch 118 is a mercury switch in which the mercury level in a capillary rises with increasing temperature. When the temperature setpoint is reached, the mercury bridges a gap between two conductors, thereby causing the temperature switch 108 to close and actuate the module 104. In other embodiments, the temperature switch 108 includes other temperature sensors that cause the temperature switch 108 to actuate upon detection of a high temperature.

The temperature switch 108 is responsive to a high local temperature. Typically, the temperature rating of cables and wiring used for a receptacle 102 is 75 degrees Centigrade. The insulation of such cables and wiring often has a melting point of 95 degrees Centigrade. In one embodiment, the temperature switch 108 has a high temperature setpoint between the cable/wiring temperature rating value and the insulation's melting temperature. In an embodiment with a cable rating of 75 degrees and an insulation melting temperature of 95 degrees, the temperature switch 108 has a setpoint at approximately 85 degrees Centigrade.

The temperature of a receptacle device 100 will increase above the room's ambient temperature for various reasons, including high current levels that are not sufficiently high to trip an upstream circuit breaker. The elevated temperature is transferred from the metal conductors to the receptacle 102. The potentially thermally hot conductors include the prongs on the plug that connects to the output connectors 110 and the service wiring that connects to the input connectors 112. The temperature sensor 118 is responsive to the temperature of the thermally hot conductors. In one embodiment, the temperature sensor 118 is in thermal contact with the receptacle 102, which has a temperature corresponding to that of the thermally hot conductors. In another embodiment, the temperature sensor 118 is positioned proximate the conductors, for example, within a cavity containing the input connections 112.

The illustrated embodiment also shows a jumper 114. The jumper 114 plugs into or otherwise connects to the receptacle 102 to connect the neutral N of the power connections 112 to the ground G of the test switch 106. The ground G of the test switch 108 is also connected to the ground G of the input 112 and output 110. In other embodiments, the function of the jumper is performed by a switch or other device that selectively connects the neutral N of the power connections 112 to the ground G of the module 104-A. With the jumper 114 connected, the embodiment with the GFI module 104-A will function when a two-conductor plug is connected to the output connections 110. With the jumper 114 disconnected, the module 104-A is suitable for three-conductor plugs.

Figure 2:
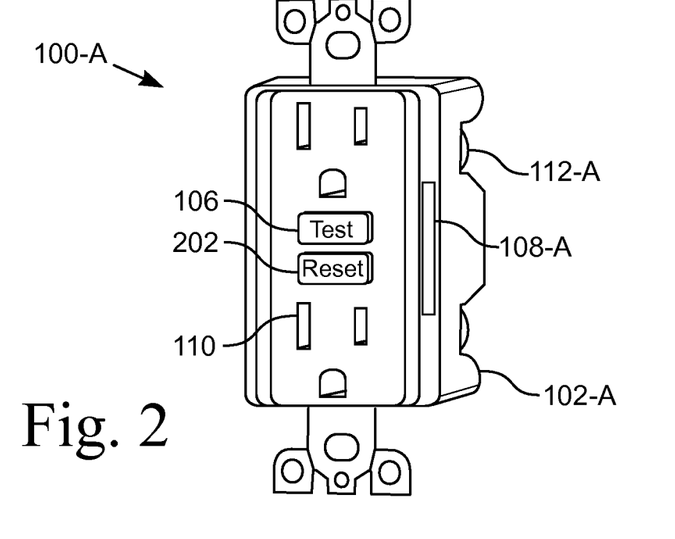
FIG. 2 is a perspective view of one embodiment of a heat actuated interrupter receptacle.

FIG. 2 illustrates a perspective view of one embodiment of a heat actuated interrupter receptacle device 100-A. The illustrated heat actuated interrupter receptacle device 100-A includes an in-wall mountable receptacle 102-A that has a pair of sockets for the output connections 110. The illustrated configuration is configured to be received by a wall mounted electrical box that has fixed wiring installed. Such wall mounted electrical boxes are used to receive electrical receptacles. The illustrated heat actuated interrupter receptacle device 100-A is dimensioned to replace a conventional receptacle in the box.

Accessible between the two sockets 110 are pushbuttons for the test switch 106 and a reset switch 202. On the rear of the receptacle 102-A are the input connections 112-A. The input connections 112-A are configured for connecting to fixed, or service, wiring that is terminated at a central circuit breaker panel. The illustrated input connections 112-A are screw terminals positioned on the rear of the receptacle 102-A in a recessed area.

Attached to the side of the receptacle 102-A is a temperature sensor 108-A. In various embodiments, the temperature sensor 108-A is embedded within the receptacle 102-A or attached to the surface of the receptacle 102-A. For the embodiment in which the temperature switch 108 includes a mercury switch, the mercury switch is attached to the receptacle 102-A such that the mercury switch is positioned with the proper orientation when the receptacle 102-A is installed.

Operating the test switch 106 interrupts the electrical circuit between the input connections 112-A and the output connections 110. When the temperature switch 108 actuates upon sensing a rising temperature greater than or equal to the setpoint, the electrical circuit between the input connections 112-A and the output connections 110 is broken or interrupted. Operating the reset switch 202 resets the heat actuated interrupter receptacle device 100-A and completes the interrupted circuit between the input connections 112-A and the output connections 110.

Figure 3:
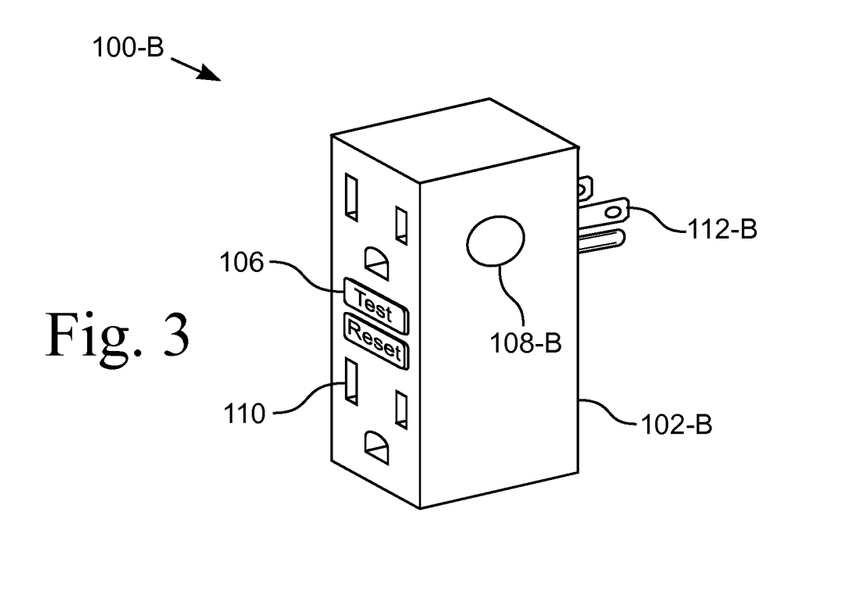
FIG. 3 is a perspective view of another embodiment of a heat actuated interrupter receptacle.

FIG. 3 illustrates a perspective view of another embodiment of a heat actuated interrupter receptacle device 100-B. The illustrated embodiment includes an adapter receptacle 102-B that is portable, that is, the adapter receptacle 102-B is configured to be plugged into a mating receptacle and the adapter receptacle 102-B is not permanently installed to the wiring connected to the central circuit breaker panel.

The adapter receptacle 102-B has an enclosure with input connections 112-B configured as a conventional plug that mates with a receptacle socket. In various embodiments, the adapter receptacle 102-B has one or a pair of input connections 112-B. In the illustrated embodiment, the temperature switch 108-B is positioned proximate the surface of the housing of the adapter receptacle 102-B. The position of the temperature switch 108-B is such that the temperature switch 108-B is responsive to heat generated by the input connections 112-B, the output connections 110, and/or internal to the interrupter receptacle device 100-B.

Figure 4:
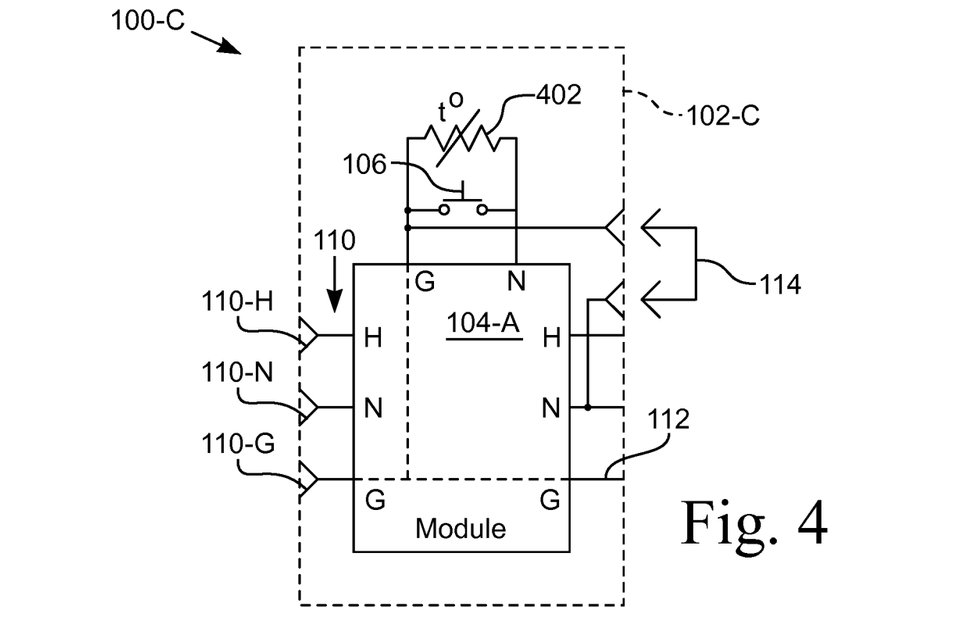
FIG. 4 is a schematic diagram of another embodiment of a heat actuated interrupter receptacle

FIG. 4 illustrates a schematic diagram of another embodiment of a heat actuated interrupter receptacle 100-C. A receptacle 102-C houses an interrupting module 104-A that includes a set of input connections 112, such as those that connect to a power source, and a set of output connections 110, such as those of a receptacle socket. The receptacle 102-C also includes a test switch 106 that is connected to the module 104-A. Connected in parallel with the test switch 106 is a temperature sensor 402.

The module 104-A, in one embodiment, is a ground fault interrupting (GFI) module that breaks, or interrupts the circuit between the input connections 112 and the output connections 110. Corresponding ones of the input connections 112 are connected to the output connections 110 to form a circuit between the input 112 and the output 110 during normal, or non-tripped, operation. The module 104-A interrupts the circuit upon detection of a ground fault condition. A ground fault condition is a current imbalance between the hot H and neutral N connections of the input connections 112, such as when the current flow through the hot H connection 110-H is greater than the current flow through the neutral N connection 110-N. In a three-conductor system, such a condition can occur when a portion of the current flowing through the hot H lead 110-H also flows through the ground G lead 110-G or through another ground connection, such as an electrical earth. The test switch 106 in such an embodiment simulates an imbalance, or a ground fault, and causes the GFI module 104-A to trip, thereby interrupting the circuit connected to the output connections 110.

The module 104-A, in another embodiment, is a circuit interrupting module that breaks, or interrupts the circuit between the input connections 112 and the output connections 110. The circuit interrupting module 104 includes a relay or circuit breaker that breaks the circuit between the input connections 112 and the output connections 110. In such an embodiment, the test switch 106 actuates the relay or circuit breaker and causes the circuit interrupting module 104 to trip, thereby interrupting the circuit connected to the output connections 110.

A temperature sensor 402 is connected in parallel with the test switch 106. In one embodiment, the test switch 106 is a normally open switch and the temperature sensor 402 is thermistor with a negative temperature coefficient. The sensor 402 has a resistance at a desired temperature sufficient to actuate the test circuit of the module 104-A. In this way, either the temperature sensor 402 or the test switch 106 will actuate the module 104-A and interrupt the circuit between the input connections 112 and the output connections 110.

The temperature sensor 402 is a thermistor with a negative temperature coefficient that is responsive to the temperature around the receptacle 102-C. When the temperature sensed by the temperature sensor 402 is at a selected temperature, the resistance of the sensor 402 falls to a level that allows sufficient current to flow through the sensor 402 and actuate the module 104-A.

The temperature sensor 402 is responsive to a high local temperature. Typically, the temperature rating of cables and wiring used for a receptacle 102 is 75 degrees Centigrade. The insulation of such cables and wiring often has a melting point of 95 degrees Centigrade. In an embodiment with a cable rating of 75 degrees and an insulation melting temperature of 95 degrees, the temperature sensor 402 is rated to have a resistance low enough to actuate the module 104-A at approximately 85 degrees Centigrade. In one such embodiment, the temperature sensor 402 has a negative temperature coefficient that results in the resistance falling to 322 ohms at 85 degrees Centigrade. Such a low resistance is sufficient to allow enough current flow through the test circuit to actuate the module 104-A for a 20 amp circuit.

The illustrated embodiment also shows a jumper 114. The jumper 114 plugs into or otherwise connects to the receptacle 102 to connect the neutral N of the power connections 112 to the ground G of the test switch 106. The ground G of the test switch 108 is also connected to the ground G of the input 112 and output 110. In other embodiments, the function of the jumper is performed by a switch or other device that selectively connects the neutral N of the power connections 112 to the ground G of the module 104. With the jumper 114 connected, the embodiment with the GFI module 104-A will function when a two-conductor plug is connected to the output connections 110. With the jumper 114 disconnected, the module 104-A is suitable for three-conductor plugs.

Figure 5:
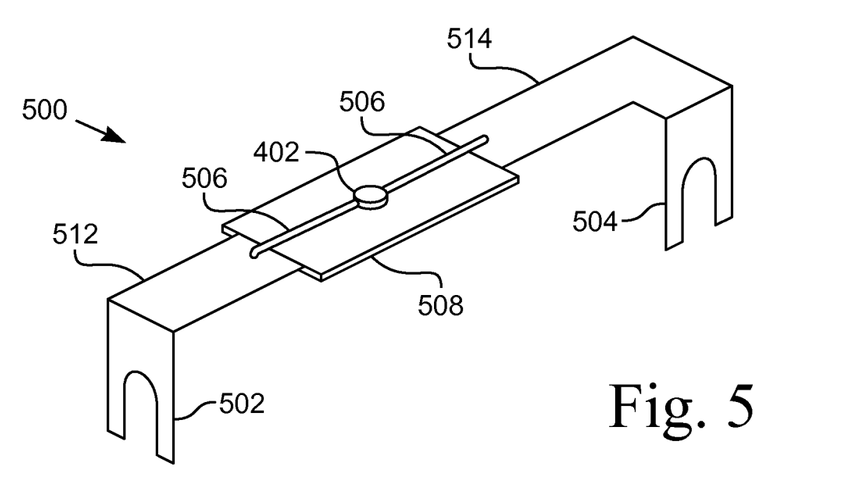
FIG. 5 is a perspective view of one embodiment of a heat sensor assembly.

FIG. 5 illustrates a perspective view of one embodiment of a heat sensor assembly 500. The heat sensor assembly 500 is configured to connect to the ground and neutral terminals on a receptacle 102. The receptacle 102, in various embodiments, may incorporate a module 104-A that is a ground fault circuit interrupter or other type of circuit interrupter, or the may be a conventional receptacle that does not include a module 104-A.

The heat sensor assembly 500 includes a first lug 502 that connects to the ground terminal on the receptacle 102 and a second lug 504 that connects to the neutral terminal on the receptacle 102. For a receptacle 102 that includes a module 104-A, the second lug 504 is configured to connect to the load, or output, terminals 110-G, 110-N of the interrupter. The two lugs 502, 504 are spade-type lugs that facilitate attaching and connecting the heat sensor assembly 500 to a receptacle 102. The corresponding terminals on the receptacle 102 are loosened and the assembly 500 is moved into position with the lugs 502, 504 engaging the terminals. When the screws of the terminals on the receptacle 102 are tightened, the assembly 500 is secured in place and the assembly 500 is electrically connected. In this way, the heat sensor assembly 500 is attached to the rear of the receptacle 102 and is closely coupled to the heat generating components when the receptacle 102 is subject to overload conditions. That is, the lugs 502, 504 are mechanically, electrically, and thermally coupled to the terminals, which are part of the receptacle 102 and subject to elevated temperatures from near overload conditions. In one embodiment, the lugs 502, 504 are repositionable to accommodate variations in the terminal positions. For example, the ground conductor 512 and neutral conductor 514 are flexible wherein the lugs 502, 504 are positioned by bending the conductors 512, 514.

The ground lug 502 is attached to a ground conductor 512 that projects at a right-angle from the lug 502. The ground conductor 512 is attached to an electrical insulator 508, such as a circuit board. The neutral conductor 514 is also attached to the electrical insulator 508. The insulator 508 is situated between the ground conductor 512 and the neutral conductor 514, providing mechanical support and electrical insulation between them 512, 514. Adjacent the insulator 508 is the temperature sensor 402, which has a pair of leads 506. One lead 506 is electrically connected to the ground conductor 512 and the other lead 506 is connected to the neutral conductor 514. The neutral conductor 514 is at a right angle to the neutral lug 504. In various embodiments, the ground conductor 512, the insulator 508 and sensor 402, and the neutral conductor 514 are encapsulated or otherwise electrically insulated from casual contact.

In another embodiment, the temperature sensor 402 is on the opposite side of the insulator 508 so that the temperature sensor 402 is positioned adjacent the back surface of the receptacle 102. In such a configuration the temperature sensor 402 is more closely positioned proximate the receptacle 102 and is more responsive to changes in temperature of the receptacle 102.

Figure 6:
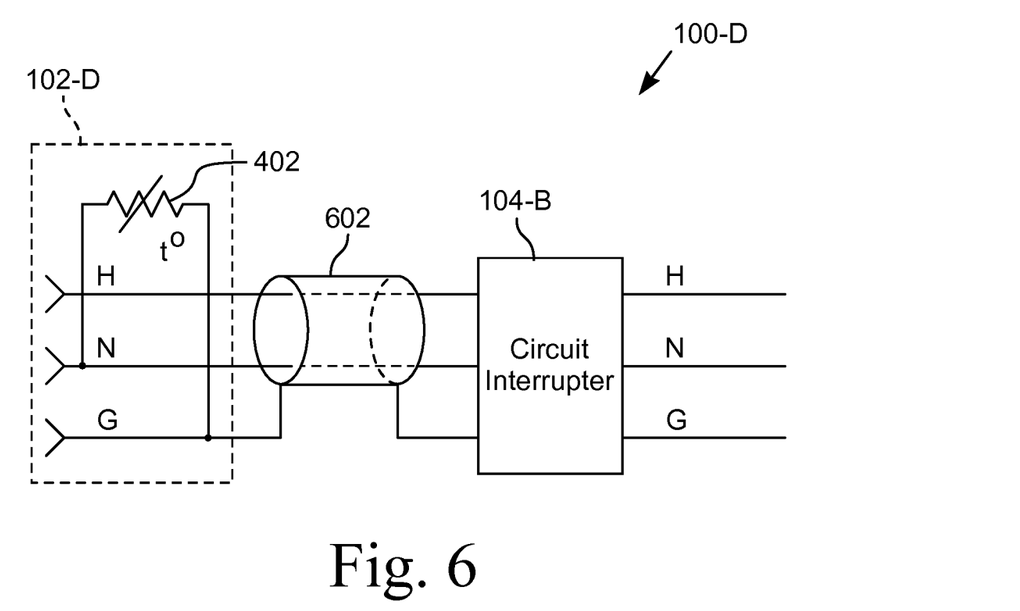
FIG. 6 is a schematic diagram of an embodiment of a heat sensor interrupting circuit.

FIG. 6 illustrates a schematic diagram of an embodiment of a heat sensor interrupting circuit 100-D. In the illustrated embodiment, a conventional receptacle 102-D includes a temperature sensor 402 connected to the neutral and ground leads. For example, the heat sensor assembly 500 is positioned proximate the receptacle 102-D with the first lug 502 connected to the ground terminal on the receptacle 102-D and the second lug 504 connected to the neutral terminal on the receptacle 102-D. The receptacle 102-D is connected to a circuit interrupter 104-B by a cable 602, such as a sheathed electrical cable. The circuit interrupter 104-B is, in various embodiments, a ground fault circuit interrupter or an arc fault circuit interrupter, that is mounted remote from the receptacle 102, such as in a breaker box. In the illustrated embodiment, the resistance of the temperature sensor 402 falls to a sufficiently low resistance value at a desired temperature, for example, 85 degrees Centigrade. The falling resistance results in sufficient current flow between neutral and ground to trip the circuit interrupter 104-B.

Figure 7:
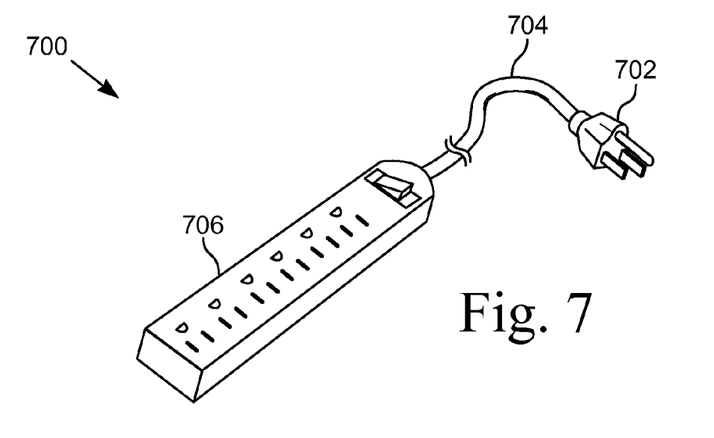
FIG. 7 is a perspective view of one embodiment of a heat sensor power strip.

FIG. 7 illustrates a perspective view of one embodiment of a heat sensor power strip 700. The power strip 700 includes a power plug 702 at one end of a cable 704. The opposite end of the cable 704 is connected to an enclosure 706 that has multiple outlets.

Figure 8:
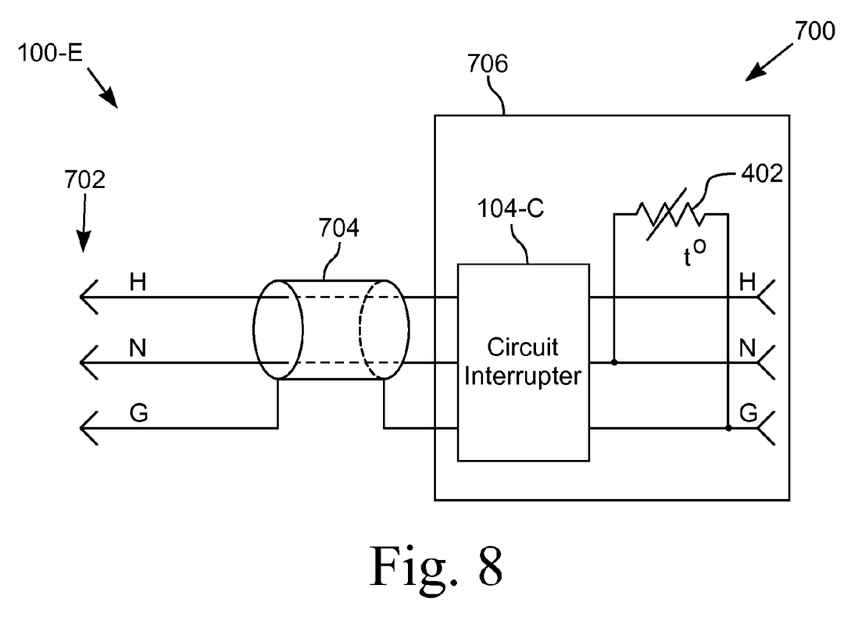
FIG. 8 is a schematic diagram of an embodiment of a heat sensor power strip.

FIG. 8 illustrates a schematic diagram of an embodiment of a heat sensor power strip 700 with heat sensor interrupting circuit 100-E. Inside the enclosure 706 is a circuit interrupter 104-C and a temperature sensor 402 that is connected across the neutral and ground conductors going to the outlets. The circuit interrupter 104-C interrupts the power from the plug 702 when there is current flow between the neutral and ground conductors, such as when the sensor 402 responds to an increasing temperature.

In another embodiment, the circuit interrupter 104-C is adjacent the plug 702 and the temperature sensor 402 is connected across the neutral and ground conductors going to the outlets. In yet another embodiment, the temperature sensor 402 is connected across the neutral and ground conductors adjacent the plug 702. The temperature sensor 402 is responsive to the temperature of the plug 702, such as the plug 702 would experience if the mating receptacle were to be overheating. The leads of the temperature sensor are routed through or alongside the cable 704 and are connected across the neutral and ground conductors going to the outlets. In this way the outlets of the enclosure 706 are powered off if the temperature of the plug 702 increases due to an overload.

Figure 9:
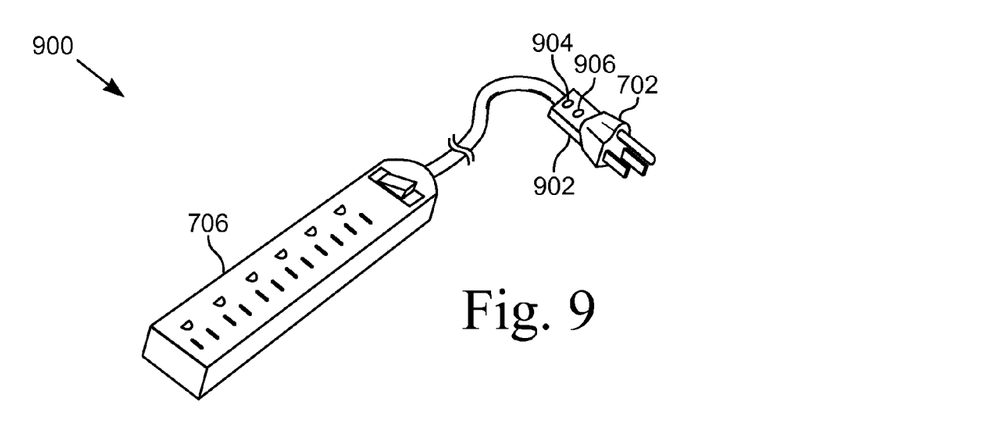
FIG. 9 is a perspective view of another embodiment of a heat sensor power strip.

FIG. 9 illustrates a perspective view of another embodiment of a heat sensor power strip 900. The power strip 900 includes a power plug 702 with an adjacent interrupter box 902. The interrupter box 902 includes a test switch 106 and a reset switch 202, such as depicted in FIGS. 2 and 3. A cable 704 extends from the interrupter box 902 to an enclosure 706 that has multiple outlets.

Figure 10:
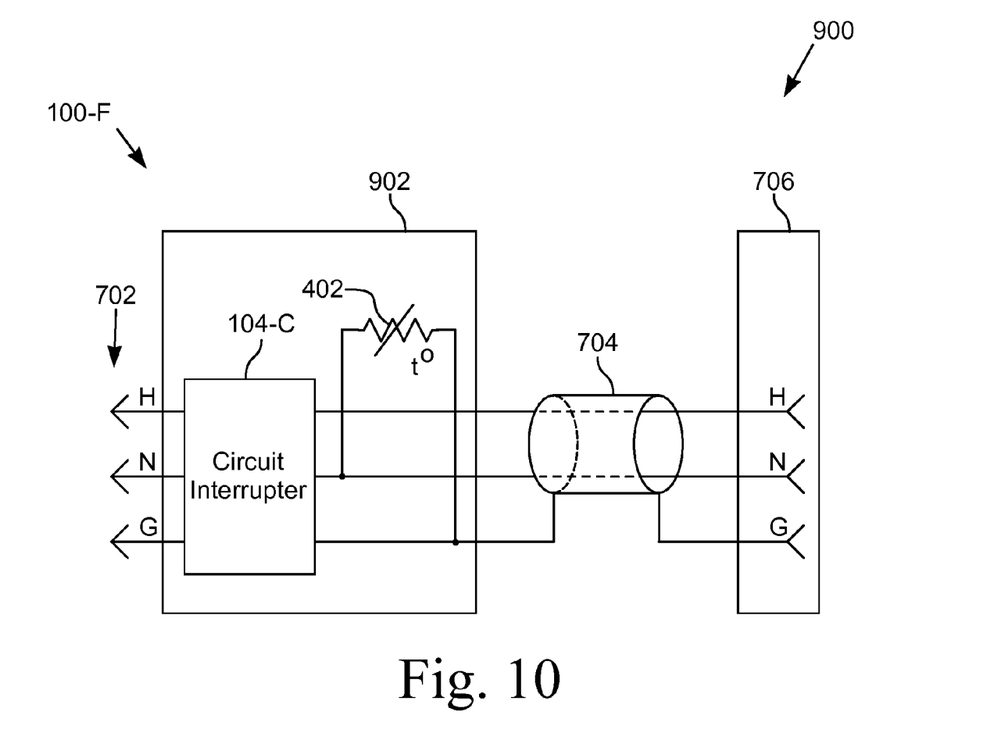
FIG. 10 is a schematic diagram of another embodiment of a heat sensor power strip.

FIG. 10 illustrates a schematic diagram of an embodiment of a heat sensor power strip 900 with heat sensor interrupting circuit 100-F. Inside the interrupter box 902 is a circuit interrupter 104-C and a temperature sensor 402 that is connected across the load side neutral and ground conductors going to the outlets in the enclosure 706. In this way the temperature of the area surrounding the plug 702 is sensed by the temperature sensor 402 and the power to the enclosure 706 is interrupted when the temperature sensor 402 senses a temperature between the cable/wire insulation maximum temperature rating and the insulation combustion or melting temperature. The temperature sensor 402 is responsive to the temperature of the plug 702, such as the plug 702 would experience if the mating receptacle were to be overheating. In this way the outlets of the enclosure 706 are powered off if the temperature of the plug 702 or the surrounding area increases due to an overload.

In another embodiment, the temperature sensor 402 is wired across the test switch 106, such as depicted in FIG. 4.

The circuit interrupter 104-C interrupts the power from the plug 702 when the sensor 402 responds to an increasing temperature.

FIGS. 1, 6, 8, and 10 illustrate a simplified schematic of various embodiments of a heat actuated circuit 100. The simplified schematics do not illustrate various connections, for example, the reset switch connections; however, those skilled in the art will recognize the need for such wiring and understand how to wire such circuits, based on the components ultimately selected for use. In various embodiments, the temperature switch 108 and the temperature sensor 402 are interchangeable.

The heat actuated interrupter device 100, 700, 900 includes various functions. The function of sensing misuse that results in an elevated operating temperature of the receptacle 102 or power plug 702 is implemented, in one embodiment, by the temperature switch 108 that is positioned at a location that has a thermally conductive path between the temperature switch 108 and the heat generating component. In another embodiment, the function of sensing misuse that results in an elevated operating temperature of the receptacle 102 or power plug 702 is implemented by a temperature sensor 402 that is positioned at a location that has a thermally conductive path between the temperature sensor 402 and the heat generating component.

The function of repeatedly detecting an over-temperature condition is implemented, in various embodiments, by a temperature switch 108 or a temperature sensor 402 that is capable of being repeatedly actuated. In one such embodiment, the temperature switch 108 is one that does not self-destruct upon actuation, such as one that relies upon a material to melt in order to operate. An example of a temperature switch 108 that is capable of being operated repeatedly is a switch in which a sensor or material 118 moves as the temperature increases until the material causes a circuit to be completed between two conductors, thereby operating the switch. In various embodiments, the material is a liquid, such as mercury, or a metal, such as a bimetallic member. In other embodiments, the temperature switch 108 is an electronic device that senses the temperature and causes a switch to operate. In one such embodiment, the temperature switch includes a temperature sensor such as a resistance temperature device (RTD) or thermistor connected to a switching circuit.

The function of interrupting a circuit is implemented, in one embodiment, by the module 104 that contains a circuit interrupting component. In one such embodiment, the module 104 is a ground fault circuit interrupter that breaks the circuit upon detection of a ground fault and also when the test switch 106 is actuated. In another such embodiment, the module 104 is a circuit interrupter, such as an arc fault interrupter, a relay, or a circuit breaker similar to that in a GFCI, that includes a test switch 106 and/or other circuitry that trips the module 104 when there is an imbalance between the current flows in the hot lead and the neutral lead, such as occurs when some of the current in the neutral is diverted to ground.

The function of resetting the interrupted circuit is implemented, in one embodiment, by the reset switch 202 that causes the module 104 to restore the interrupted circuit, providing that the over-temperature condition that caused the module 104 to interrupt the circuit has been cleared. In other words, the module 104 latches the interrupted condition when the module 104 is actuated. The module 104 is reset only when the condition causing the circuit interruption is cleared.

From the foregoing description, it will be recognized by those skilled in the art that a reusable heat actuated interrupter device 100, 700, 900 has been provided. The interrupter device 100, 700, 900 includes an interrupting module 104 that is actuated by a temperature switch 108 or a temperature sensor 402 that is responsive to the temperature proximate a receptacle 102 or power plug 702. The temperature switch 108 and the temperature sensor 402 are non-destructive elements that are operable repeatedly. The interrupting module 104 is resettable after the circuit interrupting condition is corrected and the device 100, 700, 900 is ready for use again without requiring replacement of any components.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for detecting and interrupting an overheating condition, said apparatus comprising:
   a module having a load side and a line side, said module including a circuit interrupter, said module selectively electrically connecting said load side to said line side, said load side electrically connected to a socket configured to receive an electrical power plug with at least two prongs;
   a temperature sensor electrically connected to said module, said temperature sensor being a thermistor with a negative temperature coefficient, said temperature sensor responsive to a temperature proximate a load neutral conductor, said temperature sensor allowing a current to flow between said load neutral conductor and a ground conductor when said temperature is between a maximum operating temperature and an insulation melting temperature of a wire proximate said temperature sensor; and said current being sufficient to trip said module and interrupt a circuit between said load side and said line side.

2. The apparatus of claim 1 wherein said module includes a test switch operatively connected to said module, said test switch having a normally open contact, said circuit interrupter interrupting said circuit between said load side and said line side when said test switch is actuated, said module latching being in a tripped configuration when said test switch is actuated, and said temperature sensor electrically connected in parallel with said test switch.

3. The apparatus of claim 1 further including a plug connected to said line side, said plug configured to be received by an electrical power receptacle.

4. The apparatus of claim 1 wherein said line side is configured for connecting said module to fixed wiring connected to a power source.

5. The apparatus of claim 1 wherein said load side is a two-wire power connection, and said module includes a connection from said line neutral conductor to said ground conductor.

6. The apparatus of claim 1 wherein said temperature sensor includes a ground lug and a load neutral lug, said ground lug and said load neutral lug dimensioned and configured to directly mate with a ground terminal and a load neutral terminal of said module.

7. The apparatus of claim 1 wherein said circuit interrupter is a ground fault circuit interrupter.

8. The apparatus of claim 1 wherein said temperature sensor is located proximate a power receptacle and said module is located remotely to said power receptacle.

9. The apparatus of claim 1 wherein said circuit interrupter is an arc fault circuit interrupter.

10. An apparatus for detecting an overheating condition at an electrical power receptacle, said apparatus comprising:
 a module having a load side and a line side, said module configured to repeatedly interrupt a circuit between said load side and said line side;
 a test switch operatively connected to said module, said module interrupting said circuit between said load side and said line side when said test switch is actuated, and said module latching in a tripped configuration when said test switch is actuated;
 a reset switch operatively connected to said module; and
 a temperature sensor responsive to a temperature proximate said module, said temperature sensor having a setpoint between a maximum operating temperature and an insulation melting temperature of a wire proximate said temperature sensor, said module interrupting said circuit between said line side and said load side when said temperature sensor senses said temperature being greater than said setpoint, said module resetting said circuit when said reset switch is actuated with said temperature switch sensing said temperature being less than said setpoint.

11. The apparatus of claim 10 wherein said test switch has a normally open contact that is electrically connected to said module, said temperature sensor electrically connected in parallel with said test switch, and said temperature sensor causing said module to trip when said temperature sensor senses said temperature being greater than said setpoint.

12. The apparatus of claim 10 wherein said temperature sensor is electrically connected between a load side neutral conductor and a ground conductor.

13. The apparatus of claim 10 wherein said module includes a ground fault circuit interrupter.

14. The apparatus of claim 10 further including a plug connected to said line side, said plug configured to be received by an electrical power receptacle, said module and said plug physically connected such that said plug supports said module in fixed relationship to said electrical power receptacle when said electrical power receptacle receives said plug.

15. The apparatus of claim 10 wherein said line side is configured for connecting said module to fixed wiring connected to a power source, and said module is dimensioned and configured to be mounted in a wall mounted electrical box.

16. The apparatus of claim 10 wherein said load side includes a socket configured to receive an electrical power plug, said load side being a two-wire power connection, and said module including a connection from a neutral to a ground of said input.

17. An apparatus for detecting an overheating condition at a power receptacle, said apparatus comprising:
 a temperature sensor being a thermistor with a negative temperature coefficient;
 a neutral lug electrically connected to said temperature sensor, said neutral lug having an end configured to mate with a neutral terminal in a receptacle;
 a ground lug electrically connected to said temperature sensor, said ground lug having an end configured to mate with a ground terminal in said receptacle, said neutral lug and said ground lug each having a position configured to facilitate direct connection of said ground lug to said ground terminal and said neutral lug to said neutral terminal of said receptacle.

18. The apparatus of claim 17 further including a circuit interrupter configured to repeatedly interrupt a circuit between a load side and a line side when a current is detected between a load side neutral conductor and a ground, wherein said neutral lug is electrically connected to said load side neutral conductor and said ground lug is electrically connected to said ground, said temperature sensor is responsive to a temperature proximate said receptacle, and said temperature sensor being sized to allow said current to flow between said load side neutral conductor and said ground when said temperature is between a maximum operating temperature and an insulation melting temperature of a wire proximate said temperature sensor.

19. The apparatus of claim 17 wherein said neutral lug is attached at a right angle to a first conductor, said ground lug is attached at a right angle to a second conductor, and said first conductor and said second conductor are physically connected to an electrical insulator therebetween.

20. The apparatus of claim 17 wherein said neutral lug projects from a first conductor, said first conductor attached to an electrical insulator, said ground lug projects from a second conductor, said second conductor attached to said electrical insulator, wherein said insulator provides mechanical support and electrical insulation between said first and second conductors, said temperature sensor having a first lead in electrical communication with said first conductor, and said temperature sensor having a second lead in electrical communication with said second conductor.

* * * * *